United States Patent [19]

Lynch et al.

[11] 4,165,795

[45] Aug. 28, 1979

[54] HYBRID AUTOMOBILE

[75] Inventors: Thomas E. Lynch, Gates Mills; David P. Eastman, Novelty; Richard P. Price, Parma Heights, all of Ohio

[73] Assignee: Gould Inc., Rolling Meadows, Ill.

[21] Appl. No.: 878,677

[22] Filed: Feb. 17, 1978

[51] Int. Cl.² ............................................. H02P 5/16
[52] U.S. Cl. .................................. 180/65 A; 318/139
[58] Field of Search .......................... 180/65 R, 65 A; 318/139, 140; 290/16, 50; 320/62

[56] References Cited

U.S. PATENT DOCUMENTS

| | | | |
|---|---|---|---|
| 3,551,685 | 12/1970 | Corry | 290/14 |
| 3,792,327 | 2/1974 | Waldorf | 318/139 |

Primary Examiner—Joseph F. Peters, Jr.
Assistant Examiner—Gene A. Church

Attorney, Agent, or Firm—David B. Deioma; Eber J. Hyde; Charles E. Snee, III

[57] ABSTRACT

A parallel hybrid drive system for self propelled vehicles including a direct current motor-generator having a drive shaft in common with an internal combustion engine leading to a variable speed transmission and a final drive train. The motor-generator has a no-load speed, established by a separate field exciter, below which it drives the shaft as a motor and above which it is driven by the shaft as a generator. Storage batteries are operatively connected to the motor-generator to supply power to it below the no-load speed. The internal combustion engine operates over a small RPM range around its most efficient speed at a power level established by a fixed throttle setting. The transmission is operatively connected to an accelerator and direction selector switch to vary the speed and direction of the vehicle.

27 Claims, 8 Drawing Figures

HYBRID AUTOMOBILE

BACKGROUND OF THE INVENTION

As petroleum fuels become scarcer, alternate fuels and more efficient methods of utilizing existing fuels for transportation are needed. When a vehicle, such as an automobile, is operated at an optimum power, its internal combustion engine can be relatively efficient and can have a theoretical thermal efficiency of about 25%. In normal use, i.e., some climbing hills, stopping, starting and accelerating, the actual efficiency realized is considerably less. Delivery, postal, and maintenance vehicles as well as other vehicles in severe stop-and-go situations may experience very low efficiencies. In the quest for greater efficiency, alternative drive systems and power sources have been investigated.

Because electric drive systems can be efficient, and can derive their energy from alternate fuels, the electric automobile is one alternative which has been studied in some depth. However, storage batteries are so bulky and heavy that until batteries with greater capacity and less weight are developed, it does not present a feasible alternative for any type of medium or long distance travel. Moreover, electric batteries have the disadvantage of having to be re-charged for a relatively long period of time in comparison to the time to re-fuel an internal combustion engine.

A hybride combination of a battery-electric drive system and an internal combustion engine can increase the range and usefulness of the electric drive system without the need for large or heavy batteries or long recharge periods. A hybrid electric-internal combustion engine system can also recoup some of the energy otherwise wasted by an internal combustion engine vehicle when idling or operating at low load levels. For example, when the hybrid is stopped or operating at low road-load levels, the electrical system can convert excess mechanical power from the engine into electrical energy and store it by functioning as a generator and charging storage batteries. Then, during a period of high road load levels, the electrical system can return the stored energy to the drive system thru a motor driven by the batteries. In the hybrid system described, this is achieved by operating the internal combustion engine at a relatively constant power and speed, preferably near its point of greatest efficiency, while the electrical system either stores excess available energy or returns stored energy to the driven system to supply a deficit.

In normal driving, the vehicle is called upon to climb and descend hills, stop and start, and accelerate and brake, all of which combine to put a wide range of power demands on the power plant. If only an internal combustion engine were used, it would be called upon to deliver a great range of power and operate over a wide range of speeds.

But in the hybrid electric-internal combustion engine drive system described, the internal combustion engine is called upon to deliver only a relatively even amount of power under all these conditions, because the electrical system stores the excess or supplies any deficit. Under these optimum conditions, the thermal efficiency of the hybrid engine is always about 25% which is significantly better than the average efficiency realized in a conventional internal combustion engine vehicle.

For internal combustion engines, there is, of course, a preferred speed and power level at which to operate the engine. Herein the preferred speed and power level selected was that at which the engine would provide the vehicle in which it is mounted with the greatest mileage per given quantity of liquid petroleum fuel. However, other criteria could be used in making the selection such as the speed and power level at which the engine produces the least amount of pollutants, etc.

This hybridization produces many beneficial results. Compared to a conventional internal combustion engine vehicle, the hybrid can: employ a smaller engine; provide greater fuel economy; produce lower exhaust emissions and furnish longer engine life with less maintenance. These benefits accrue from the use of the electrical system as a load leveler, i.e., to store or release energy as required and thereby maintain engine power at a point of greatest efficiency or lowest emissions. Operation at relatively constant power and engine speed also provides a more uniform engine operating condition which reduces engine wear.

Compared to an all electric vehicle, the hybrid can: employ smaller batteries with less capacity; reduce or eliminate battery recharging by the conventional way, and provide increased vehicle range and usefulness. These benefits similarly accrue from the use of the electrical system as a load leveler, i.e., the batteries are only required to furnish tractive power to the drive system for short periods of time. Benefits also derive from proper design of the system so that the batteries are kept recharged, more or less, by the engine and motor generator whenever the vehicle is stopped or road load requirements are less than engine power output. Range is naturally extended because all or a large part of the energy required for normal operation can now be supplied by the petroleum fueled engine instead of the batteries.

Moreover, in the past, in order to maintain an internal combustion engine in a hybrid system at a nearly constant power level and to control transfer of power between the engine and motor-generator, relatively complex engine or electric motor controls were necessary. See for example U.S. Pat. No. 3,732,751. The present invention eliminates the need for such complex controls.

The present invention, then, uses a relatively small internal combustion engine. One, which when operating at a preferred speed, produces roughly the average power which the vehicle will require in normal use. This invention further uses a direct current motor-generator with a peak power capability at least equal to the difference between average and peak system power requirements and with a no-load speed comparable to the preferred speed of the internal combustion engine. At motor-generator speeds below the no-load speed, this motor-generator draws current from the batteries and functions as a motor. At speeds above the no-load speed, the motor-generator furnishes current to the batteries and functions as a generator.

In this manner, speed variations of the motor-generator, above and below the no load speed, control the load leveling operation of the system, i.e., the flow of power to or from the batteries, the motor-generator and the drive system. These motor-generator speed variations depend significantly upon the characteristic of a free running internal combustion engine to respond naturally to changes in shaft loading by changes in engine speed, i.e., the engine slows down under load and speeds up as the load is reduced. Because the engine and motor-generator are directly connected, changes in the engine speed, caused either by road load variations or by other drive system demands, result in corresponding changes in the speed and power output of the motor-generator.

In the generator mode, the power supplied to the batteries by the motor-generator increases the more the speed exceeds the no-load speed. However, the motor-generator also places a load on the internal combustion engine. This load slows the rotation of the internal combustion engine and tends to hold the operating point close to the preferred speed. By contradiction, in the motor mode the power supplied by the motor-generator tends to accelerate the rotation of the internal combustion engine. In the heavy load situation, where the motor-generator is in the motor mode, this added power also pushes the internal combustion engine closer to its preferred operating speed.

By way of example, when a vehicle equipped with a hybrid engine system, which is traveling along powered by the internal engine alone, encounters a hill, the increased load caused by ascending the hill causes the vehicle and the internal combustion engine to slow down. When the internal combustion engine slows below its preferred speed, which is also the no-load speed of the motor-generator, the motor-generator functions as a motor. The motor-generator acting as a motor transfers energy from the storage battery to the drive shaft, increasing the speed of the vehicle and, hence, increasing the speed of the internal combustion engine back toward its preferred speed. Conversely, when the vehicle starts descending a hill or slowing for a traffic light, the internal combustion engine, having less load, will begin operating above its preferred speed. The motor-generator then is similarly driven above its no-load speed and functions as a generator. In the generator mode, the motor-generator puts a load on the internal combustion engine which again brings its speed back toward the preferred speed and at the same time converts any excess engine power into electric energy to be stored in the batteries. The response of the system is, of course, so smooth and continuous that the motor-generator will change modes without the average operator noticing any change in the internal combustion engine performance. Thus, both power units run simultaneously and load share, all the time conserving energy without elaborate controls.

BRIEF SUMMARY OF THE INVENTION

A drive system for vehicles having a motor-generator which has a no-load speed below which it supplies power as a motor and above which it is driven as a generator. An electric energy storage means supplies power to the motor-generator below the no-load speed and receives power above the no-load speed. The drive shaft of the motor-generator is connected to the drive shaft of an internal combustion engine which is constrained to a small range of speeds about its most efficient operating speed. This speed range also includes the no-load speed of the motor-generator. A transmission operatively connects the common drive shaft to a final drive train.

DETAILED DESCRIPTION OF THE DRAWINGS

For a better understanding of the present invention, together with other and further objects thereof, reference is had to the following description taken in connection with the accompanying drawings, and its scope will be pointed out in the appended claims.

Figure 1:
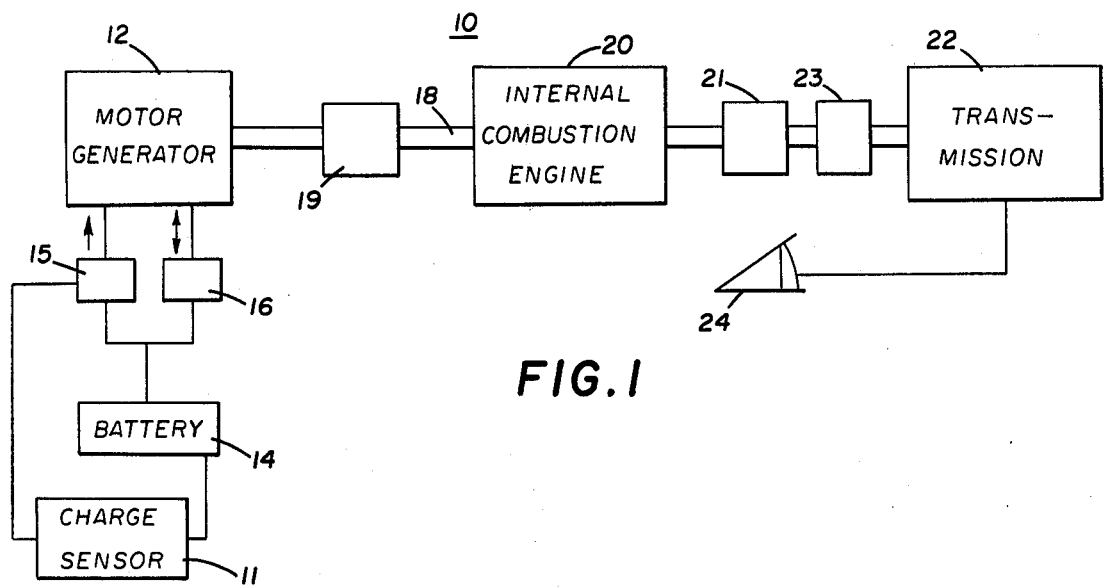
FIG. 1 is a schematic representation of the hybrid drive system of this invention.

It should be understood that the following illustration and description relate to one embodiment of the components in the invention and that other alternate arrangements could be constructed. The drive system 10 of FIG. 1 includes a transducer for converting electrical energy to mechanical and vice versa. In the preferred embodiment, the transducer is a direct current motor-generator 12 operatively connected to storage batteries 14 by appropriate electrical connection(s) through a constant current field exciter circuit 15 and a motor starting and protection circuit 16. The motor-generator 12 is connected to shaft 18 directly or through a fixed ratio gear box 19. An internal combustion engine 20 is also connected to shaft 18 as is transmission 22. A second fixed ratio gear box 21 and/or a clutch 23 may be inserted in the shaft 18 between the internal combustion engine and transmission 22. The gear box 19 may be used to match the no-load speed of the motor-generator with the preselected or preferred operating speed of the internal combustion engine, and a gear box 21 may be used to match the engine operation speed with the transmissions input requirements. The clutch 23 may be used to disengage the engine from the transmission and drive train so that the engine may operate the generator separately. In this mode, when the engine is not propelling the vehicle, frictional energy consumption of the transmission can be eliminated. One example of a transmission found to be successful in this environment is a Sundstrand, oil hydraulic piston positive displacement infinitely variable fluid transmission. An accelerator 24 controls the speed of the vehicle. A direction selector switch (not shown) controls the forward-reverse operation of the vehicle. The accelerator and direction selector switch are connected to an electric servo valve on the transmission which acts to vary or reverse the direction of hydraulic fluid flow in the transmission which changes the speed or the direction of the vehicle in which drive system 10 is placed. It is understood that a mechanical linkage could also be used to interconnect the accelerator 24 and the transmission 22.

The internal combustion engine should be selected to provide adequate power at a desirable engine speed. This means that the engine should be of such a size that its power output at the desirable engine speed can supply about the average power or total energy required by the vehicle to execute a typical daily mission. In other words, as much energy should be supplied to the batteries during periods of low load as is drawn from the battery in periods of high load, when averaged over the duration of a typical mission. Thus, ideally, batteries will not have to be recharged between missions, nor will fuel be consumed to produce more electrical energy than can be stored for latter use. A type of internal combustion engine which has been found to be satisfactory in this environment is Onan Model NHC-MS which is a 25 horse power engine that has its greatest efficiency near 2500 RPM, at a continuous power output of about 17 horse power. An acceptable motor-generator has been found to be a separately excited shunt field DC electric motor of about 30 peak horse power rating, which is also commercially available. Although the motor-generator may use most any voltage, it has been found that using two parallel sets of six (12 volt) batteries (72 volts) is satisfactory. The batteries should be designed for short duration, high current discharge and have a low internal resistance. This can be achieved by using standard automotive starting batteries with a large number of thin plates.

Figure 6A:
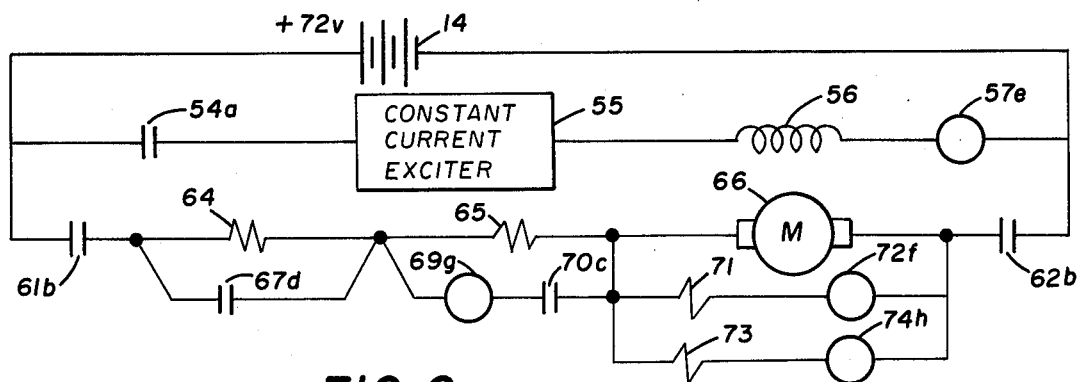
FIGS. 6a and 6b are a schematic diagram of the motor starting, protection and field exciter circuitry.
Figure 6B:
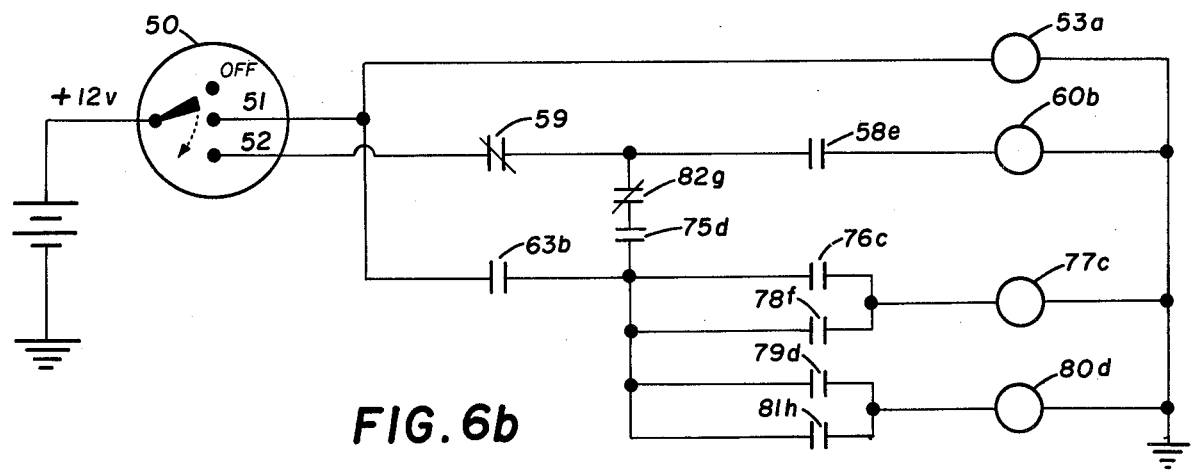

FIGS. 6A and 6B illustrate the motor starting, protection and field exciter circuitry for the hybrid. Switch 50 (FIG. 6b) has three positions, OFF, normal running position 51 and start position 52. To start the motor, switch 50, like an automobile ignition, is turned to connect it with contact 51, and then to contact 52. It is understood that the design of the switch permits momentary contact with contact 52 without interruption of the circuit thru contact 51. As soon as switch 50 reaches contact 51, relay coil 53A is operated (FIG. 6b). This, in turn, closes normally open contact 54A (FIG. 6a). Closing contact 54A completes the circuit from the batteries through constant current field exciter 55 through the field winding 56 of the motor-generator. It is important that 55 be a constant current field exciter in order to establish accurately the no-load speed of the motor-generator. Under normal operating conditions, the motor temperature would vary causing changes in the resistance of the field winding which, in turn, would cause the current through it to vary greatly. Any variation in field current would affect the no-load point of the motor-generator. Also in series with field winding 56 is the coil of a weak field relay 57E. Weak field relay 57E operates to prohibit the motor from working when the field winding has insufficient current flowing through it. As long as sufficient current is flowing through the field winding, and hence through the coil of relay 57E, then normally open contact 58E (FIG. 6b) of the relay will be closed.

Now, placing switch 50 in the momentary start position 52 allows power to flow through neutral safety switch 59 and through contact 58E of the weak field relay, which is closed, and on through relay coil 60B. Neutral safety switch 59 is a contact of the direction selector which contact is closed only when the forward-reverse selector is in the neutral position. The power going through relay coil 60B closes normally open main line contacts 61B and 62B (FIG. 6a) which allow current to flow through the motor armature coils 66 by way of resistors 64 and 65. Relay coil 60B also closes normally open relay contact 63B (FIG. 6b) whose significance will be seen later. As the motor increases speed, the back EMF of the motor across relay coil 72F (FIG. 6a) and resistor 71 will increase until the point at which relay coil 72F is activated closing relay contact 78F (FIG. 6b). This puts power through relay coil 77C causing it to close normally open relay contacts 70C (FIG. 6a) and 76C (FIG. 6b). Relay contact 76C acts to hold relay 77C actuated and contact 70C causes the current flowing to the motor winding relay to bypass resistor 65. Current flowing through contact 70C will also flow through the coil of overload relay 69G. Overload relay 69G is normally not activated, but if the current should become too great, the relay will actuate opening normally closed contact 82G (FIG. 6b). The opening of contact 82G on overload will allow relay coil 60B to drop, opening contacts 61B, 62B and 63B shutting off current flow to the motor.

Bypassing resistance 65 allows the motor to rotate faster yet which further increases the back EMF across the relay coils 72F and 74H and resistors 71 and 73. When the motor operates still faster yet, the motor back EMF across relay coil 74H will become sufficient to cause relay coil 74H to actuate closing normally open relay contact 81H. (FIG. 6b). The closing of relay contact 81H actuates relay coil 80D which, in turn, closes relay contacts 67D (FIG. 6a), 75D and 79D (both FIG. 6b). Relay contact 79D acts to hold relay coil 80D actuated and to maintain contact 67D bypassing resistor 64. When resistor 64 is bypassed, the motor windings are receiving full power.

Contacts 82G and 75D, along with contact 63B provide a path in parallel with the momentary contact positions 52 path to relay coil 60B. Once the motor is up to operating speed, i.e., when relay 80D has operated, switch 50 is set back to position 51. The parallel path through 63B, 75D, and 82G provides the power for the steady state operation of relay 60B, and indirectly 77C and 80D.

In the preferred embodiment, the motor-generator also functions as the starter motor for the internal combustion engine. This is a natural consequence of the direct shaft connection between the engine and motor, which simultaneously brings the engine up to operating speed when the motor accelerates to this same speed. Alternately a conventional automotive starter motor could be used to start the internal combustion engine and with it the coupled motor-generator.

Significant by its absence is any electrical circuitry to vary the speed of the motor-generator or to control the transfer of energy between the motor generator and the internal combustion engine in response to accelerator commands as was commonly done in the prior art. As mentioned above, the throttle of the internal combustion engine is constrained so that the internal combustion engine runs at nearly constant power and a motor-generator is selected which has its no-load speed, the most efficient preferred operating speed of the internal combustion engine.

Figure 2:
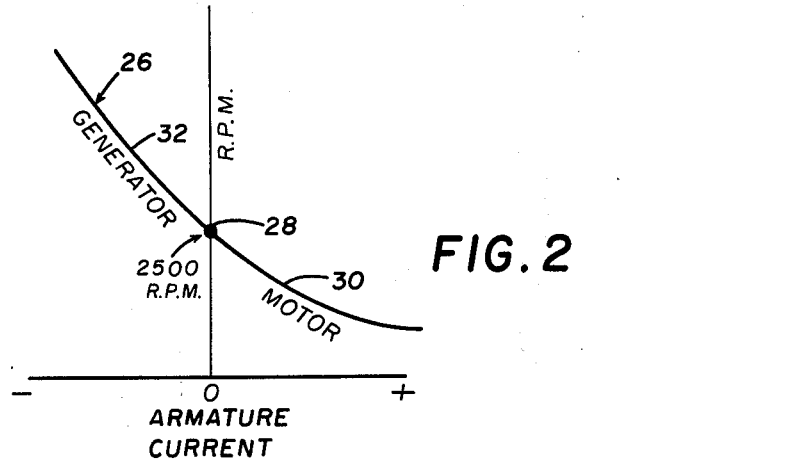
FIG. 2 is a graphical representation of the speed versus armature current of a motor-generator.

As represented by FIG. 2, the speed versus armature current characteristic of an ideal lossless D.C. motor-generator is a curve 26, moving downward with decreasing slope. The no load speed of this ideal motor-generator is represented by point 28 where the curve 26 intersects the line representing zero armature current flow. This characteristic is the result of many physical factors, but in a given separately excited motor-generator, is principally governed by the field excitation provided by constant current field exciter 15. A change in the field current will cause the curve 26 to intersect the zero armature current line at a point above or below the point illustrated.

For a given field excitation, then, curve 26 illustrates the manner in which armature current varies and reverses direction as the speed of an ideal motor-generator is varied above and below the no load speed. For the sake of illustration, current drawn from the batteries to discharge them is represented as positive, and current furnished to the batteries to charge them is represented as negative. At speeds below the no load speed, represented by curve segment 30, positive armature current is drawn from the batteries and the motor-generator functions as a motor. At speeds above the no load speed, represented by curve segment 32, armature current reverses and the motor-generator functions as a generator. This behavior is a consequence of the direction and magnitude of the counter EMF of the motor, which varies with field excitation and motor speed, and the fixed EMF of the batteries. The speed at which these EMF's are equal and opposite in direction is the ideal no load speed and therefore the speed at which no armature current flows.

In actuality due to friction, windage and other losses experienced in a real motor-generator, the true no load speed will be slightly below the speed illustrated and a slight positive current will be drawn from the batteries to maintain this speed, but this will not otherwise affect the foregoing explanation with respect to the relative direction and magnitude of current flow above and below the ideal no load speed.

In the system described, the field exciter 15 provides a constant field current of an appropriate value to cause the motor-generator no load speed to be equal to the preferred operating speed of the internal combustion engine which is directly connected to it.

The storage batteries 14 receive electrical energy from the motor-generator during curve segment 32 in which it is acting as a generator and supply energy to the motor generator during that part of the curve 30 in which it is acting as a motor. It is thus a property of the motor-generator as utilized in this invention to eliminate much of the complexity of motor-generator speed control circuitry of previously designed hybrid vehicles while retaining many of the functions.

Optionally, a charge sensor 11 (FIG. 1) monitors the charge in batteries 14. If the state-of-charge is low, the charge sensor causes field exciter 15 to increase the field slightly. This lowers the no load speed of the motor-generator which puts the motor-generator into the generator mode at a lower speed. If the state-of charge is high, the constant current is slightly decreased so that the motor-generator starts converting the stored electric energy to mechanical energy at a higher speed. This change in the no-load speed will permit the system to compensate automatically for missions with a higher or lower average power consumption requirement.

Figure 3:
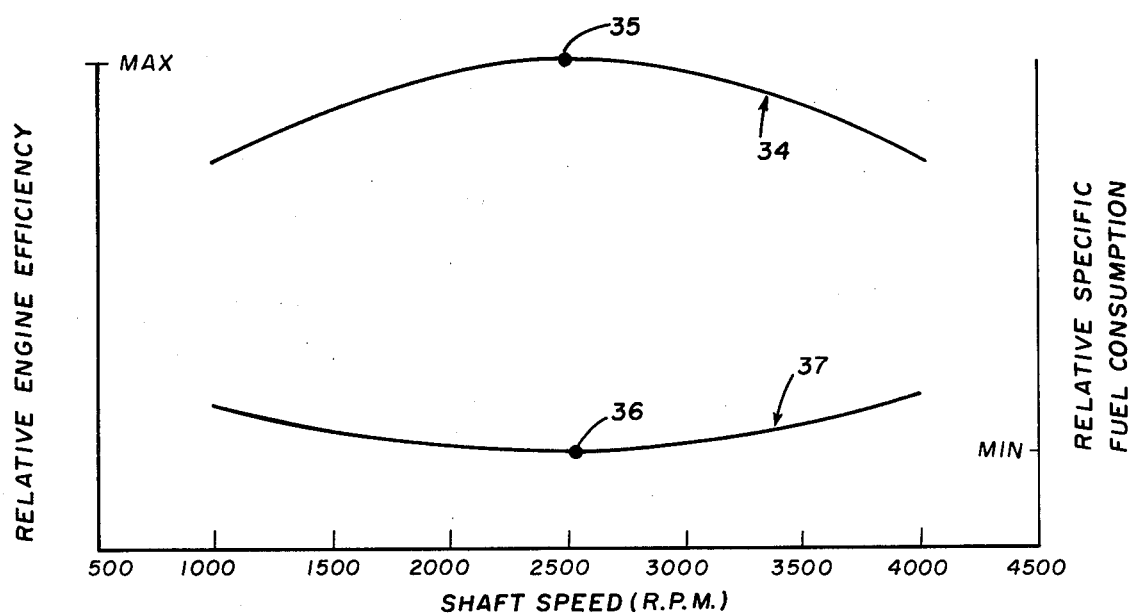
FIG. 3 is a plot of relative engine efficiency and specific fuel consumption versus shaft RPM of an internal combustion engine.

The second property utilized in this invention is illustrated in FIG. 3 which illustrates the relative efficiency and specific fuel consumption of an internal combustion engine versus shaft RPM. The graph shown in FIG. 3 is illustrative of the power level of the particular embodiment. It is understood that other internal combustion engines of different sizes and designs may have different relative efficiencies at different power levels. However, in general, there is a speed and power level at which the internal combustion engine reaches its peak efficiency. As noted in FIG. 3 by curve 34, the internal combustion engine used here operates near to peak efficiency at about 2500 RPM and a power level of about 17 horse power represented by point 35. At this power level, the efficiency decreases as the speed varies significantly above or below 2500 RPM. However, at speeds near 2500 RPM, say from 2000 to 3000 RPM, the efficiency remains almost constant and near to peak. In order to create an efficient drive system, it is desirable to use each component in its most efficient range. For the internal combustion engine used in the preferred embodiment, the range from 2000 to 3000 RPM was chosen as the most efficient range through which the internal combustion engine could be operated. Maximum utilization is thereby made of the fuel necessary to run the engine by operating the internal combustion engine at or very near its point of minimum specific fuel consumption illustrated by point 36 of fuel consumption curve 37.

The use of an internal combustion engine fixed to operate in a range near its speed of peak efficiency and minimum specific fuel consumption in combination with a motor-generator which has its no-load speed approximately the same as the internal combustion engine's speed of peak efficiency is an important feature of the present invention. It provides maximum output from the components of this system with the minimum energy waste. In the preferred embodiment, the 2500 RPM mid-range operating point of the internal combustion engine is also the no-load speed of the motor-generator which further eliminates energy waste by eliminating the need for fixed ratio gear box 19.

It should be recognized that under certain conditions the drive system described could exceed safe operating speeds established for the engine and motor-generator, for example during downhill operation. This, of course, can be prevented by an engine overspeed governor which limits drive system speed to a safe value. In the preferred embodiment, this can be achieved by an engine governor which limits drive system speed to 3200 RPM by partially closing the spring restrained carburetor throttle.

In operation, the engine throttle is set for a power level which will cause the internal combustion engine to run at about 2500 RPM under a normal or average load. At this speed, the motor-generator will neither supply nor remove torque from the system. The throttle setting is established by a spring and remains fixed during the operation of the vehicle except when the engine attempts to overspeed.

When external forces on the shaft 18 cause the engine 20 to slow down below 2500 RPM, the motor-generator supplies torque to the shaft. For example, on an upgrade, the internal combustion engine would naturally slow down with the speed of the vehicle. As the speed of the internal combustion engine decreases below 2500 RPM, the shaft transmits this speed to the motor-generator. As the motor-generator decreases below 2500 RPM, the current through the armature in the motor direction increases, as represented by range 30 of FIG. 2. The greater the current increases, the greater the torque the motor provides. In this range, power from storage batteries 14 is transformed to rotational power on shaft 18, by means of motor-generator 12.

Conversely, when outside influences on the vehicle cause an increase in engine RPM, such as the vehicle traveling downhill, the internal combustion engine will speed up beyond 2500 RPM. Again, the drive shaft 18 will transmit this speed to the motor-generator which will then be operating in the portion of the curve 32 of FIG. 2 as a generator. When acting as a generator, some of the torque from the shaft 18 is converted to electrical energy and transmitted through electrical connections to storage batteries 14. Thus, energy is not lost but stored for use at a later time. This combination of operating an internal combustion engine at a fixed throttle (power) setting, as well as the use of a motor-generator and storage batteries to provide additional power or to store excess energy combines to give more peak power to operate the vehicle than would otherwise be available from an electric motor and batteries alone. Moreover, the engine can be much smaller than previously thought necessary. For example, an engine of less than 20 horse power can provide all of the energy to propel a vehicle weighing approximately 3300 pounds without undue sacrifice of performance.

Figure 4:
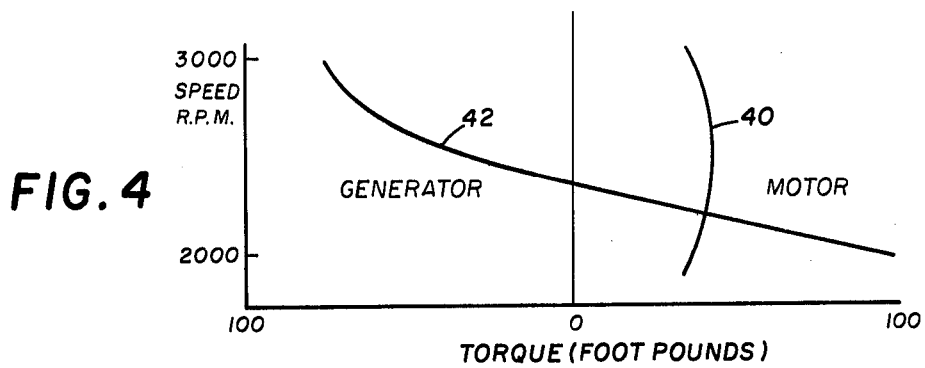
FIG. 4 illustrates the separate torque-speed curves of the hybrid engine and the motor-generator.

A further property is partly illustrated by FIG. 4 which shows the separate speed versus torque curves for both internal combustion engine, curve 40, and the motor-generator, curve 42. As shown by curve 40, the torque of the internal combustion engine at a fixed throttle (power) setting is relatively constant over a range of shaft speeds. Whereas the torque of the motor-generator, curve 42, varies significantly with shaft speed. The torque of the motor-generator used in the preferred embodiment has a range of about −85 to 100 foot pounds. Whereas the internal combustion engine used in the preferred embodiment operates over a range of about 36 to 42 foot pounds. Above 2500 RPM the motor-generator generator (operating in the generator mode) subtracts the torque necessary to operate a generator from the torque of the internal combustion engine. Below 2500 RPM, the motor-generator (operating in its motor mode) adds its torque to that of the internal combustion engine.

Figure 5:
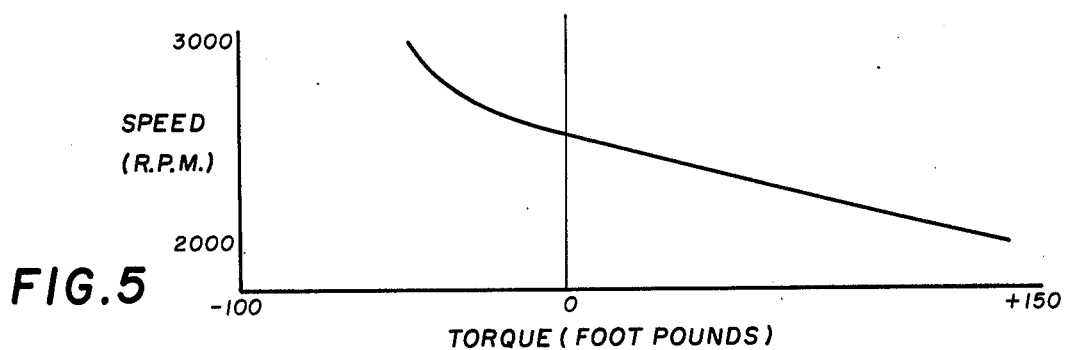
FIG. 5 illustrates the net torque output of the hybrid engine and motor drive system.

FIG. 5 illustrates the effect of combining the torques of the motor-generator and internal combustion engine.

This invention may also utilize other types of engines, such as a diesel or turbine. Moreover, it is also anticipated that other combinations of these components with different types of transmissions may be utilized and are intended to be within the scope of the invention.

It will be recognized that the system described is inherently capable of supplying over a long period of time just enough energy to accomodate the energy requirements of a particular mission.

Further, the components and their operating points may be selected to operate such that different missions can be accommodated and different ratios of electrical to chemical energies can be used. For example, the system can be adjusted so that the batteries are fully charged at the beginning of a mission and discharged at the end. This would cause the vehicle to use less chemical fuel but would necessitate a battery charging period.

Figure 7:
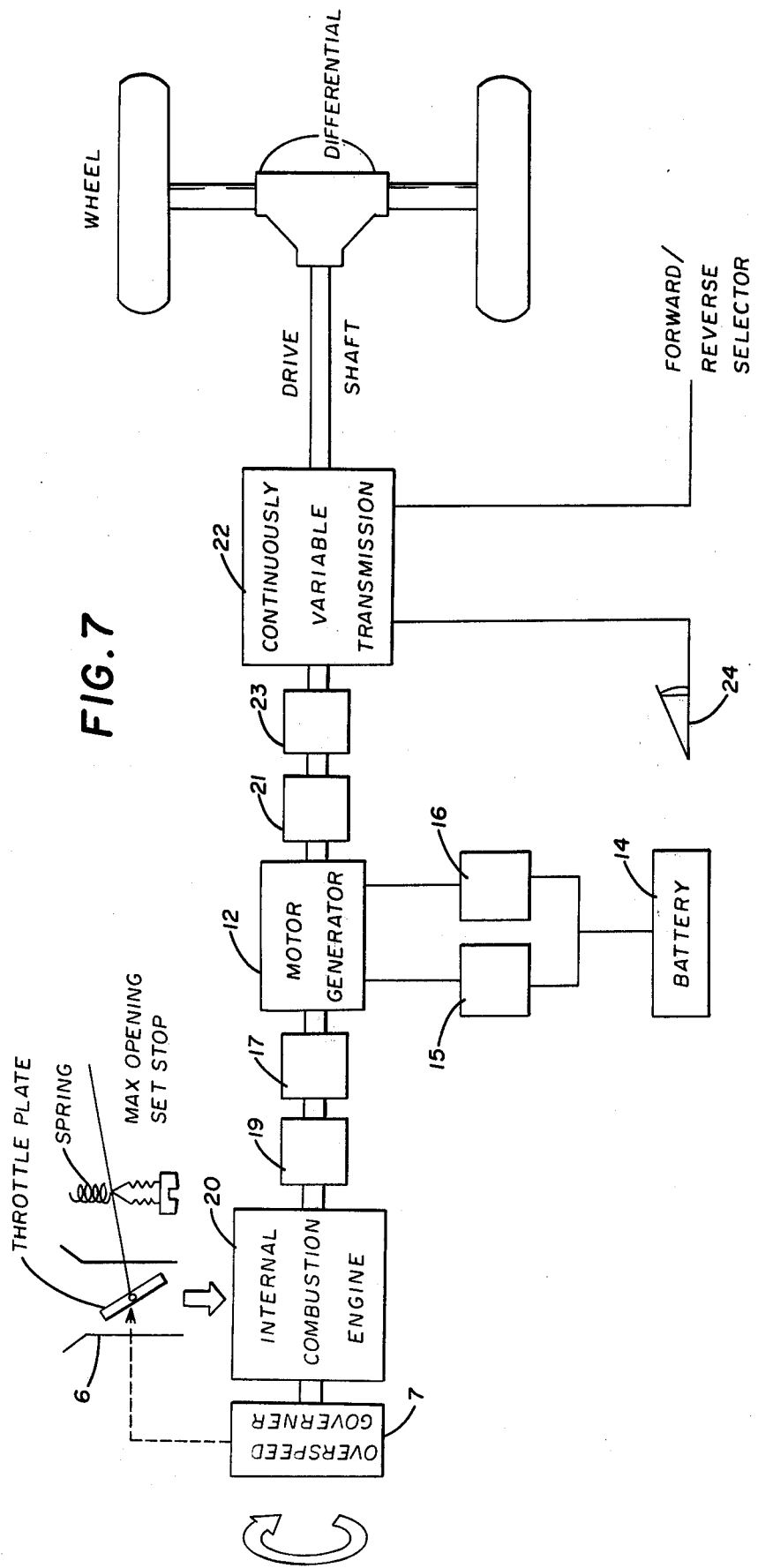
FIG. 7 is an alternate schematic representation of the hybrid drive system of this invention.

FIG. 7 illustrates an alternate embodiment of the system. Note that the relative positions of the motor-generator 12 and the internal combustion engine 20 are reversed and clutch 17 is added to permit independent electric drive system operation. Another feature of the invention is the overspeed governor which protects the system from damagingly high speeds. In response to a preset high speed, the governor 7 causes the throttle plate in carburetor 6 to become more closed. A drive shaft and differential for connecting the hybrid power plant to the drive wheels of a vehicle are shown diagrammatically.

The specific hardware is shown by way of example only. It is not intended that the invention be limited to a specific physical form. Rather the numerous equivalent hardware which falls within the scope of the appended claims are embodiments of the present invention.

What is claimed:

1. A drive system for vehicles comprising: an internal combustion engine having a drive shaft;
   a motor-generator operably connected to said drive shaft for rotation therewith, said motor-generator having a no-load speed which is within the range of speeds of said internal combustion engine, below said no-load speed said motor-generator drives the drive shaft as a motor and above said no-load speed said motor-generator is driven by said drive shaft as a generator;
   an electric energy storage means operably connected to said motor-generator, said storage means supplying electric energy to the motor-generator when said motor-generator is operating below said no-load speed and collecting electrical energy when said motor-generator is operating above said no-load speed; and
   means driven by said drive shaft for transmitting the combined mechanical power of said engine and said motor-generator to the drive wheels of a vehicle.

2. The drive system of claim 1, wherein the internal combustion engine and the motor-generator are mounted on a common drive shaft.

3. The drive system of claim 2, wherein the internal combustion engine operates between 1000 and 4000 RPM.

4. The drive system of claim 3, wherein said no-load speed of the motor-generator is about 2500 RPM.

5. The drive system of claim 4, wherein said motor-generator transmits power from the electric energy storage means to the drive shaft from 1000 to about 2500 RPM and the motor-generator transmits power from the drive shaft to the electric energy storage means from about 2500 to 4000 RPM.

6. The drive system of claim 1, further including a continuously variable speed transmission connected to said drive shaft, which transmission is fully reversible and wherein an accelerator control is connected with the transmission to control the speed at which the drive system would propel a vehicle.

7. The drive system of claim 1, further including a fixed ratio gear box connecting said motor-generator to said drive shaft.

8. The drive system of claim 7, wherein the gear ratio is such that the no-load speed of said motor-generator is matched to the speed at which said internal combustion engine operates with maximum efficiency.

9. The drive system of claim 1, further including a transmission separated from said internal combustion engine and said DC motor-generator by a clutch, whereby said internal combustion engine and said DC motor-generator can be disconnected from said transmission.

10. The drive system of claim 1, further including a charge sensor means connected to said energy storage means increasing the no-load speed of the motor-generator in response to a high state of charge in the energy storage means and for decreasing the no-load speed of the motor-generator in response to a low state of charge.

11. A drive system including:
    a motor-generator comprising an armature winding and a means for producing a magnetic field across the armature winding to generate an armature current which increases with armature speed;
    a magnetic field exciter means for causing said magnetic field producing means to produce and maintain a magnetic field across the armature winding of such magnitude and direction that at one speed of armature rotation the voltage across said armature winding is equal and opposite to the voltage across said electric energy storage means, whereby the resulting armature current flow is in a first direction when the speed of armature rotation is below said one speed and the net current flow is in the opposite direction when the speed of armature rotation is above said one speed;

a first drive shaft means rotatable with said armature windings;

an internal combustion engine means including a second drive shaft means connected to said first drive shaft means for rotation therewith; and means driven by one of said drive shaft means for transmitting the combined mechanical power of said motor-generator and said engine means to the drive wheels of a vehicle.

12. The drive system of claim 11, wherein a fixed ratio gear means connects said first drive shaft means and said second drive shaft means.

13. The drive system of claim 11, wherein said first drive shaft means and the said second drive shaft means are integrally connected segments of a single drive shaft element.

14. The drive system of claim 11, further including transmission means connected to one of said drive shaft means for changing the speed of the vehicle.

15. The drive system of claim 14, wherein said speed changing means can vary the speed of a vehicle along a continuum of speeds and can be set changeably to fix the vehicle speed to any speed between its maximum forward and maximum reverse speed.

16. The drive system of claim 11, wherein said means for producing a magnetic field is a motor-generator field winding and said magnetic field exciter is a constant current exciter connected in series with said field winding.

17. A variable speed drive system including:

a motor-generator means having a rotatable drive shaft;

magnetic field exciter means for the motor-generator means such that said motor-generator changes between a motor mode and a generator mode at a preselected speed;

a liquid fueled engine means including a carburetor with a fixed throttle setting and a drive shaft connected with said motor-generator means drive shaft;

a transmission means connected with at least one of said drive shafts;

a power output shaft connected to said transmission means; and a speed control means connected with said transmission means to vary the speed of rotation of the output shaft.

18. The variable speed drive system of claim 17, wherein said transmission means is connected to said motor-generator means drive shaft.

19. The variable speed drive system of claim 17, wherein said transmission means is connected to said liquid fueled engine means drive shaft.

20. The variable speed drive system of claim 17, wherein said liquid fueled engine means is an internal combustion engine.

21. The variable speed drive system of claim 20, wherein said fixed carburetor throttle setting is such that the internal combustion engine produces about $\frac{1}{2}$ horsepower for each 100 pounds of vehicle weight.

22. The variable speed drive system of claim 17, wherein said speed control means is the sole means for varying the speed of the drive system power output shaft.

23. The variable speed drive system of claim 17, further including electric energy storage means connected to said motor-generator means and means for adjusting said field exciter means in response to the level of charge in said electric energy storage.

24. The variable speed drive system of claim 23, in which said field exciter means includes an adjustable constant current source.

25. The variable speed drive system of claim 17, further including an overspeed governor means for reducing said throttle setting in response to an excess speed of rotation of said drive shaft of said liquid fueled engine.

26. A power train including:

an armature of an electric motor-generator and an internal combustion engine both connected to a drive shaft;

means for supplying relatively constant power to said drive shaft from said internal combustion engine over a predetermined range of drive shaft speeds;

battery means connected to an armature winding in said motor-generator whereby said motor-generator is changed between a motor mode and a generator mode by the speed of said armature;

variable transmission means connected between said drive shaft and a power output shaft; and speed control means for varying said transmission means whereby the speed of the output shaft is controlled by varying the transmission means.

27. The power train of claim 26, in combination with a vehicle such that the speed of the vehicle is controlled by the transmission and control means and wherein changes in the load on the vehicle cause changes in the speed of said drive shaft.

* * * * *